United States Patent Office 3,306,934
Patented Feb. 28, 1967

3,306,934
5 - (AMINOPROPYLIDENE)- AND 5 - HYDROXY-5-(AMINOPROPYL) - 3 - DIALKYLSULFAMOYL-5H-DIBENZO[a,d]CYCLOHEPTENES
Edward L. Engelhardt, Gwynedd Valley, and Marcia E. Christy, Colmar, Pa., assignors to Merck & Co., Inc., Rahway, N.J., a corporation of New Jersey
No Drawing. Filed Sept. 24, 1962, Ser. No. 225,864
5 Claims. (Cl. 260—556)

This invention relates to 5H-dibenzo[a,d]cycloheptenes. In particular, the invention relates to 5H-dizenzo[a,d]cycloheptenes which are substituted at their 5-position with a tertiary aminopropylidene radical and at the 3-position with a sulfamoyl radical. The invention also relates to processes for preparing said compounds, to novel intermediates and their preparation.

The compounds encompasssed within the scope of the present invention may be represented by the general structural formulae:

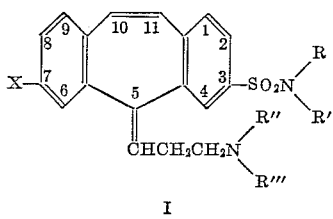

I and

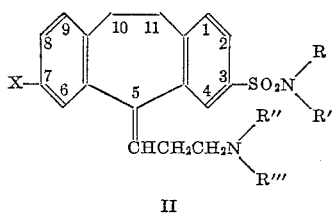

II wherein R and R', which can be similar or dissimilar, are each lower alkyl radicals, either straight or branched chain, having up to 4 carbon atoms; R" and R'", which can be similar or dissimilar, are each lower alkyl radicals, either straight or branched chain, having up to 6 carbon atoms and lower alkyl radicals linked together through an atom selected from the group consisting of carbon, nitrogen and oxygen to form a heterocyclic ring having from five to six atoms therein such as 1-piperidyl, 1-pyrrolidyl, 4-morpholinyl and 1-lower alkyl-4-piperazinyl. The compounds may have substituents on the propylidene side chain such as lower alkyl radicals, preferably having from 1 to 4 carbon atoms, and X represents hydrogen or halogen, preferably bromine or chlorine.

Representative compounds encompassed within the scope of the present invention include:

5-(3-dimethylaminopropylidene)-3-dimethylsulfamoyl-5H-dibenzo[a,d]cycloheptene
5-(3-dimethylaminopropylidene)-3-diethylsulfamoyl-5H-dibenzo[a,d]cycloheptene
5-(3-dimethylaminopropylidene)-3-di-n-butylsulfamoyl-5H-dibenzo[a,d]cycloheptene
5-[3-(1-methyl-4-piperazinyl)-propylidene]-3-dimethylsulfamoyl-5H-dibenzo[a,d]cycloheptene
5-[3-(4-morpholinyl)-propylidene]-3-dimethylsulfamoyl-5H-dibenzo[a,d]cycloheptene
5-[3-(1-piperidyl)-propylidene]-3-dimethylsulfamoyl-5H-dibenzo[a,d]cycloheptene
5-[3-(1-pyrrolidyl)-propylidene]-3-dimethylsulfamoyl-5H-dibenzo[a,d]cycloheptene
5-(3-dimethylaminopropylidene)-7-bromo-3-dimethylsulfamoyl-5H-dibenzo[a,d]cycloheptene
5-(3-dimethylaminopropylidene)-10,11-dihydro-3-dimethylsulfamoyl-5H-dibenzo[a,d]cycloheptene
5-(3-dimethylaminopropylidene)-7-chloro-10,11-dihydro-3-dimethylsulfamoyl-5H-dibenzo[a,d]-cycloheptene
5-(3-dimethylaminopropylidene)-3-(N-ethyl-N-methyl)-sulfamoyl-5H-dibenzo[a,d]cycloheptene The compounds may be administered orally or parenbe employed in pharmaceutical applications because they have been found to possess both tranquilizing and antidepressant activity. In addition, some of the compounds also possess antihistaminic activity.

The compounds may be administered orally or parenterally in the form of aqueous solutions or suspensions, but they are preferably administered orally in the form of tablets, powders, sustained release pellets and the like. When administered orally or parenterally, satisfactory results are obtained at a daily dosage level of from about 25 mg. to about 500 mg., preferably given in divided doses over the day or in sustained release form. The compounds are preferably administered in the form of their non-toxic acid addition salts and these salts as well as other non-toxic salts are included within the scope of this invention.

The compounds represented by structure II hereinabove, wherein X is halogen, may be prepared by treating a 10,11-dihydro-3-halo-5H-dibenzo[a,d]cyclohepten-5-one with a halosulfonic acid to form the corresponding 10,11-dihydro-7-halo-3-halosulfonyl ketone, condensing this with a mono or dialkylamine to form the corresponding 3-alkylsubstituted sulfamoyl-10,11-dihydro-7-halo ketone, condensing this with a Grignard reagent and hydrolyzing the resulting Grignard adduct to form the corresponding 3 - alkylsubstituted sulfamoyl - 5 - hydroxy - 5 - (3 - tertiary aminopropyl) derivative and then dehydrating the 5-hydroxy derivative. This process may be illustrated generally as follows:

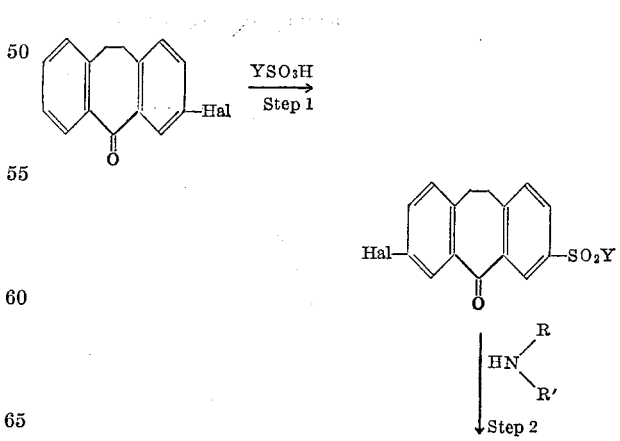

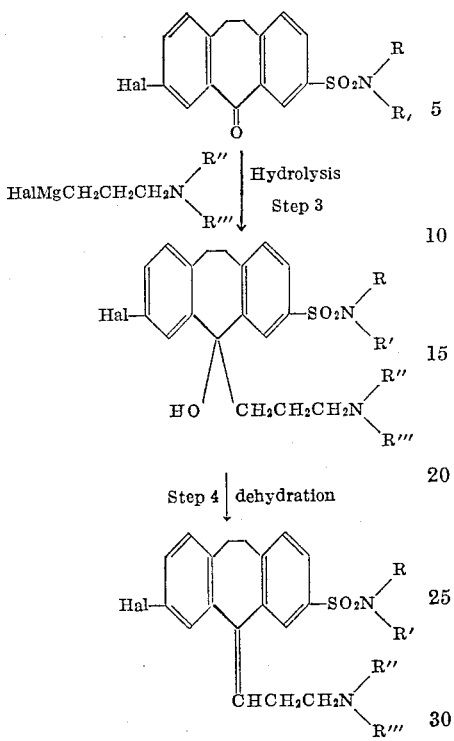

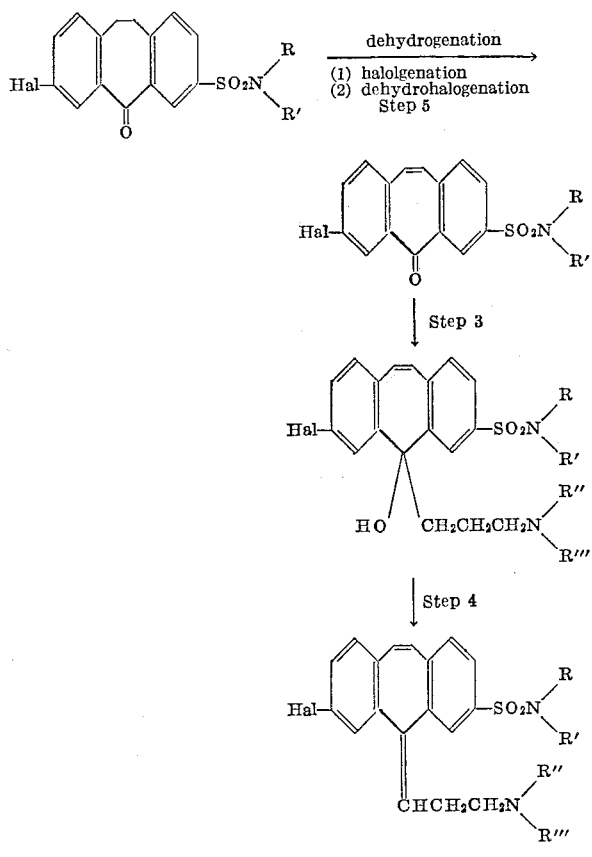

wherein Hal and Y represent halogen and R, R', R" and R'" are as previously defined.

To prepare the compounds represented by structural Formula I wherein X is halogen, the compound resulting from Step 2 is subjected to dehydrogenation. Conversion of the resulting 10, 11-unsaturated ketone to the desired compound is then effected following Steps 3 and 4 above. This process may be represented as follows:

wherein Hal, R, R', R" and R'" are as previously defined.

To prepare the compounds represented by structural Formulae I or II wherein X is hydrogen, the appropriate compound, as explained hereinbelow, resulting from Step 2 or 5 is subjected to a dehalogenation step whereby the halogen is removed and replaced by hydrogen. Conversion of the dehalogenated ketone to the desired compound is then effected following Steps 3 and 4 above. This process may be represented as follows:

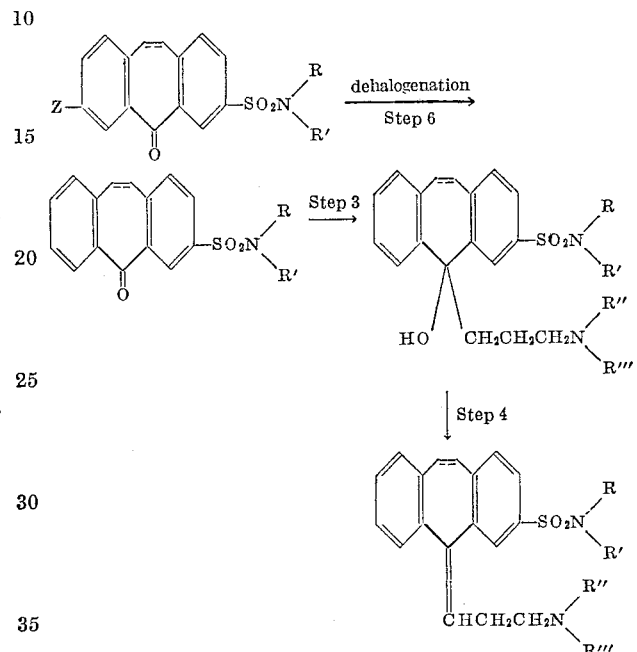

wherein Z represents bromine or iodine and R, R', R" and R'" are as previously defined.

The dotted line between the 10 and 11 carbon atoms indicates that the compounds may be saturated or unsaturated at this location, the saturated compound being identified throughout the specification and claims by the 10,11-dihydro designation.

In carrying out the dehalogenation (Step 6), it is essential that the halogen to be removed be either bromine or iodine inasmuch as it is not possible to remove fluorine or chlorine by dehalogenation under the conditions specified hereinbelow for carrying out Step 6. Thus, where it is desired to prepare those compounds represented by structural Formulae I or II, wherein X is hydrogen, it is necessary to start with either the 10,11-dihydro-3-iodo-5H-dibenzo[a,d]cyclohepten-5-one or 3-bromo-10,11-dihydro-5H-dibenzo[a,d]cyclohepten-5-one, the latter being preferred.

Furthermore, where it is desired to prepare those compounds represented by structural Formula I, wherein X is hydrogen, it is not necessary to dehydrogenate (Step 5) before dehalogenating (Step 6). Thus, if desired, the appropriate, as explained above, compound resulting from Step 2 may first be dehalogenated to produce the corresponding 3-alkylsubstituted sulfamoyl-10,11-dihydro-5H-dibenzo[a,d]cyclohepten-5-one which is then subjected to dehydrogenation to produce the corresponding 10,11-unsaturated ketone. Conversion of the ketone to the desired compound is then effected following Steps 3 and 4 above. This may be illustrated as follows:

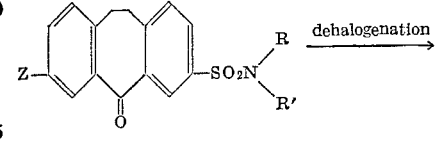

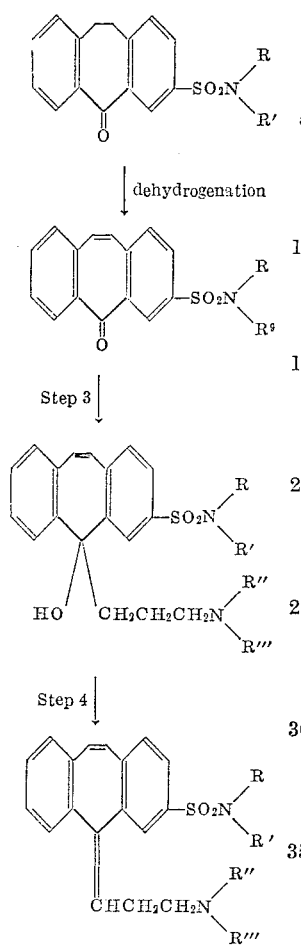

wherein Z, R, R', R" and R'" are as previously defined.

The starting compounds, namely, the 10,11-dihydro-5H-dibenzo[a,d]cyclohepten-5-one, having a halogen substituent in the 3-position of the benzene ring, may be prepared following the procedure described by S. O. Winthrop et al. for the preparation of 3-chloro-10,11-dihydro-5H-dibenzo[a,b]cyclohepten-5-one appearing in the J. Org. Chem., 27, 230–240 (1962). The 3-bromo-10,11-dihydro-5H-dibenzo[a,d]cyclohepten - 5 - one prepared in this manner has a melting point of 79.5–80.5° C.

Step 1 of the process involves treating a 10,11-dihydro-3-halo-5H-dibenzo[a,d]-cyclohepten-5-one with a halosulfonic acid, preferably fluorosulfonic acid, to form the corresponding 10,11 - dihydro-7-halo-3-halosulfonyl-5H-dibenzo[a,d]cyclohepten-5-one. It is essential in carrying out this step that one start with the 3-halo ketone. The halogen acts as a blocking group, thereby avoiding the formation of the undesired di-(halosulfonyl) substituted ketone.

The reaction of the ketone with fluorosulfonic acid, for example, may be carried out in the presence of a suitable inert organic solvent. However, the use of a solvent is not necessary since the fluorosulfonic acid can be used for this purpose. The reaction may be conducted at room temperature or at elevated temperatures up to about 100° C. Preferably, the reaction is carried out at about 80–90° C. It is preferred to employ an excess of the fluorosulfonic acid particularly when it is also utilized as a solvent for the reaction. The reaction is preferably allowed to proceed to completion after which time the product may be isolated by adding the mixture to ice-water and recovering the precipitated product by filtration. The crude product can be further purified by crystallization from a suitable solvent.

Step 2 of the process involves conversion of the halosulfonyl to the dialkylsulfamoyl group by reaction with a dialkylamine. In the case of dimethylamine, which is a gas at room temperature, the reaction is preferably carried out in the presence of an exert organic solvent such as dioxane and the gas bubbled in or added as an aqueous solution. With respect to other dialkylamines which are liquids at room temperature, the use of a solvent is not necessary since the amine may be used for this purpose. The reaction may be conducted at room temperature or at elevated temperatures. Preferably, the reaction is carried out at the reflux temperature of the mixtures. The ratio of reactants is not critical and equimolar amounts may be utilized although it is preferred to employ an excess of the amine, particularly when it is also utilized as a solvent. The reaction is preferably allowed to proceed to completion and the crude product then is recovered after evaporation of the mixture to dryness by extraction with a suitable solvent and removal of the solvent. The product can be further purified by crystallization from a suitable solvent.

The Grignard reagent employed in Step 3 may be prepared by known procedures, but it has been found that it may be prepared in high yields as follows:

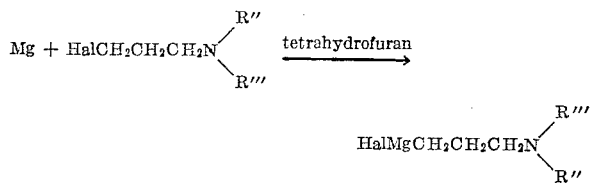

wherein Hal, R" and R'" are as previously defined.

It has been found that the use of tetrahydrofuran as the solvent for the reaction results in rapid production of the Grignard reagent in the high yield.

The reaction with the Grignard reagent (Step 3) is preferably initially carried out under cooled conditions such as by the use of an ice-bath and finally may continue at room temperature. It has been found that tetrahydrofuran is an excellent solvent for carrying out the reaction and, accordingly, the ketone may be added directly to the reaction mixture in which the Grignard reagent was prepared. However, any inert solvent for the reactants may be employed. Hydrolysis of the Grignard adduct is carried out in such a way that strongly acidic conditions are avoided, and water alone may be sufficient.

After the addition reaction is completed, the bulk of the solvent is removed by vacuum distillation, the Grignard adduct dissolved in a suitable solvent such as benzene and hydrolyzed by the addition of water or ammonium chloride solution with cooling. The product is recovered by evaporation of the solvent after separating inorganic material by filtration.

The dehydration, Step 4, may be effected by means of such commonly used dehydrating agents as acetyl chloride, acetic anhydride, or thionyl chloride. The alcohol may be dehydrated directly or may be first converted to a salt such as the hydrochloride, hydrobromide or sulfate. Conversion to the salt prior to dehydration is preferable in some cases. The reaction may be carried out in an excess of dehydrating agent or a solvent such as chloroform or glacial acetic acid may be employed. The desired product is recovered after rendering the mixture alkaline by extraction with a suitable solvent and then removing the solvent.

The dehydrogenation step (Step 5), which is utilized to prepare compounds which are unsaturated at the 10, 11-position, involves treating the compound resulting from Step 2 or the 10,11-saturated compound from Step 6 (described more fully hereinbelow), as desired, with a halogenating agent such as N-bromosuccinimide, N-chlorosuccinimide, bromine, chlorine or sulfuryl chloride in the presence of a suitable inert organic solvent to form the 10 or 11-halogen containing intermediate. Conversion to the 10,11-unsaturated compound is then effected by treatment of the halogen containing intermediate with a hydrogen halide acceptor. Suitable hydrogen halide acceptors are the tertiary amines such as, for example, triethylamine. The crude product is recovered by extraction with a suitable inert solvent and may be purified by repeated crystallizations from a suitable solvent.

Dehalogenation (Step 6) is effected by catalytic hydrogenation at atmospheric pressure. The compound to be dehalogenated is dissolved in a suitable organic solvent containing a sufficient amount of a hydrogen halide acceptor, such as triethylamine, to remove the hydrohalide formed during hydrogenation. The solution is hydrogenated at atmospheric pressure and in the presence of a suitable catalyst such as 10% paladium on charcoal until the theoretical quantity of hydrogen has been adsorbed. After removal of the catalyst and solvent, the crude residue is triturated with a suitable organic solvent to precipitate the hydrohalide which is then removed by filtration. Evaporation of the solvent yields the crude product which can be purified by crystallization.

As indicated hereinabove, in carrying out the dehalogenation it is essential that the halogen to be removed be either bromine or iodine inasmuch as it is not possible to remove fluorine or chlorine by dehalogenation under the conditions specified above.

It will be appreciated by those skilled in the art that the compounds of the present invention exist as geometric isomers. The separation of these isomers can be achieved by conventional techniques such as is illustrated in the examples.

As has previously been pointed out, the compounds of the present invention possess tranquilizing and anti-depressant activity. With certain compounds it has been found that one form is substantially more active than the other. This is particularly true of the compound 3-dimethylsulfamoyl-5-(3-dimethylaminopropylidene) - 5H-dibenzo[a,d]cycloheptene in which the β-form is the more active.

The preparation of representative compounds encompassed within the scope of the present invention is described in the following examples. However, it is to be understood that these examples are illustrative only and are not to be construed as in any way limiting the scope of the invention.

EXAMPLE 1

*3-dimethylsulfamoyl-5-(3-dimethylaminopropylidene)-
5H-dibenzo[a,d]cycloheptene*

A. *7-bromo-3-fluorosulfonyl-10,11-dihydro - 5H - dibenzo[a,d]cyclohepten-5-one.*—Fluorosulfonic acid, 100 ml., is placed in a 300 ml. 3-necked round bottom flask equipped with polyethylene inlet tube and polyethylene exit tube with drying tube half filled with anhydrous sodium fluoride. A nitrogen atmosphere is maintained throughout the reaction. With stirring, 17.0 g. (0.059 mole) of 3-bromo-10,11-dihydro-5H-dibenzo[a,d]cyclohepten-5-one is added in portions over 20 minutes. After stirring another 10 minutes, the dark green solution is heated on the steam-bath for 6½ hours. The mixture then is cooled to room temperature, poured cautiously with stirring into 1.5 kg. of crushed ice, and allowed to stand overnight at room temperature. The brown solid is collected, washed with water, dried in a vacuum desiccator over sodium hydroxide, and then extracted in a Soxhlet extractor with 700 ml. of boiling cyclohexane for 16 hours. On cooling, the cyclohexane extract deposits 11.65 g. (53%) of 7-bromo-3-fluorosulfonyl-10,11-dihydro-5H-dibenzo[a,d]cyclohepten-5-one as dark yellow flakes, M.P. 148–151° C. Recrystallizations from ether and cyclohexane gives an analytical sample, M.P. 150–152° C.

*Analysis.*—Calcd. for $C_{15}H_{10}O_3FBrS$: C, 48.79; H, 2.73; S, 8.69. Found: C, 48.78; H, 2.83; S, 8.87.

B. *7 - bromo-3-dimethylsulfamoyl-10,11-dihydro - 5H-dibenzo[a,d]cyclohepten-5-one.*—7-bromo - 3 - fluorosulfonyl-10,11 - dihydro - 5H - dibenzo[a,d]cyclohepten-5-one (2.5 g., 0.00677 mole) together with 30 ml. of 25% aqueous dimethylamine and 30 ml. of p-dioxane is heated to refluxing for 3 hours. The brown solution is evaporated to dryness under reduced pressure and the residue partitioned between benzene and water. After washing with water, the benzene layer is evaporated to dryness under reduced pressure, leaving 7-bromo-3-dimethylsulfamoyl-10,11-dihydro - 5H - dibenzo[a,d]cyclohepten-5-one as a tan solid, M.P. 142–145° C., in a yield of 2.1 g. (80%). An analytical sample melt at 146–148° C. after crystallizations from mixtures of benzene and hexane and from methanol.

*Analysis.*—Calcd. for $C_{17}H_{16}O_3NBrS$: C, 51.78; H, 4.09; N, 3.55. Found: C, 51.71; H, 4.12; N, 3.53.

C. *3-dimethylsulfamoyl - 10,11 - dihydro-5H-dibenzo[a,d]cyclohepten-5-one.*—7-bromo - 3 - dimethylsulfamoyl-10,11-dihydro-5H-dibenzo[a,d]cyclohepten-5-one, 8.0 g. (0.0203 mole), is dissolved in a mixture of 100 ml. of absolute ethanol, 70 ml. of dimethylformamide, and 5 ml. of triethylamine. The solution is hydrogenated at atmospheric pressure and in the presence of 600 mg. of 10% palladium on charcoal catalyst until hydrogen uptake is complete. Catalyst is removed by filtration and washed with absolute ethanol. The filtrate is evaporated to dryness under reduced pressure and the residue triturated with benzene. The insoluble triethylamine hydrobromide is filtered and the benzene filtrate evaporated to dryness under reduced pressure. Crystallization of the residual white solid from absolute ethanol affords 6.1 g. (97%) of 3-dimethylsulfamoyl - 10,11 - dihydro-5H-dibenzo[a,d]cyclohepten-5-one, M.P. 122–124° C. The melting point is unchanged after crystallization from absolute ethanol.

*Analysis.*—Calcd. for $C_{17}H_{17}O_3NS$: C, 64.74; H, 5.44; N, 4.44. Found: C, 64.20; H, 5.47; N, 4.16.

D. *3-dimethylsulfamoyl-5H-dibenzo[a,d]cyclohepten-5-one.*—A mixture of 3-dimethylsulfamoyl-10,11-dihydro-5H-dibenzo[a,d]cyclohepten-5-one (6.1 g., 0.0194 mole), N-bromosuccinimide (3.6 g., 0.029 mole), benzoyl peroxide (50 mg.), and 50 ml. of benzene is stirred and heated to refluxing for 3 hours. The precipitated succinimide is filtered and washed with warm benzene. After washing with 5% aqueous sodium hydroxide and then with water, the benzene filtrate is evaporated to dryness under reduced pressure. The residual oily solid is suspended in 75 ml. of triethylamine and the mixture stirred at reflux for 16 hours. Triethylamine is evaported under reduced pressure and the residual solid partitioned between benzene and water. The benzene layer is separated, washed with 3 N hydrochloric acid and then with water, and evaporated to dryness under reduced pressure. Crystallization of the residual solid from 95% ethanol gives 2.83 g. (46.5%) of 3-dimethylsulfamoyl-5H-dibenzo[a,d]cyclohepten-5-one, M.P. 129.5–135.5° C. An analytical sample melts at 138.5–139.5° C. after repeated crystallizations from 95% ethanol.

*Analysis.*—Calcd. for $C_{17}H_{15}O_3NS$: C, 65.16; H, 4.83; N, 4.47. Found: C, 64.88; H, 4.85; N, 4.11.

E. *3-dimethylsulfamoyl-5-(3-dimethylaminopropyl - 5-hydroxy - 5H - dibenzo[a,d]cycloheptene.*—The Grignard reagent is prepared from 4.86 g. (0.2 g. atom) of magnesium and 24.34 g. (0.2 mole) of 3-dimethylaminopropyl chloride in 100 ml. of tetrahydrofuran as described in U.S. Patent No. 3,046,283, Step A of Example 2. In a nitrogen atmosphere, which is maintained throughout the reaction, 7.0 ml. of a 1.7 M solution of the Grignard reagent in tetrahydrofuran is added dropwise over a period of 15 minutes to a stirred solution of 2.0 g. (0.0064 mole)

of 3 - dimethylsulfamoyl-5H-dibenzo[a,d]cyclohepten-5-one in 25 ml. of tetrahydrofuran cooled in an ice-bath. After stirring another 15 minutes in the cold and 1½ hours at room temperature, the bulk of the solvent is distilled below 40° C. under reduced pressure. The residue is dissolved in 25 ml. of benzene and after cooling in an ice-bath, the Grignard adduct is hydrolyzed by the dropwise addition of 8 ml. of water. The benzene solution is decanted from the gelatinous precipitate which is extracted further with three 20 ml. portions of boiling benzene. The combined benzene extract is washed with water and then extracted with two 20 ml. portions of 0.1 M citric acid. The acid extract is made basic with sodium hydroxide and the base extracted into benzene. Evaporation of the washed benzene extract under reduced pressure and crystallization of the white solid residue from 75% ethanol yields 1.68 g. (65.5%) of 3-dimethylsulfamoyl-5-(3-dimethylaminopropyl) - 5 - hydroxy-5H-dibenzo[a,d]cycloheptene, M.P. 148.5–149.5° C. The melting point is unchanged by crystallization from cyclohexane.

*Analysis.*—Calcd. for $C_{22}H_{28}O_3N_2S$: C, 65.97; H, 7.05; N, 7.00. Found: C, 65.93; H, 7.18; N, 6.90.

F. *3-dimethylsulfamoyl - 5 - (3 - dimethylaminopropylidene)-5H-dibenzo[a,d]cycloheptene.*—A solution of 2.72 g. (0.00175 mole) of 3-dimethylsulfamoyl-5-(3-dimethylaminopropyl)-5-hydroxy - 5H - dibenzo[a,d]cycloheptene in 20 ml. of trifluoroacetic acid and 12 ml. of trifluoroacetic anhydride is heated to refluxing for 1 hour. After another hour at room temperature, the solvents are evaporated under reduced pressure. The residual syrup is treated with water, cooled in an ice-bath, made basic with sodium hydroxide, and extracted into benzene. Evaporation of the washed benzene extract leaves 2.7 g. of oily base. The hydrogen oxalate salt is prepared by treating a solution of the base in isopropyl alcohol with a solution of a slight excess of oxalic acid in isopropyl alcohol. The yield of 3-dimethylsulfamoyl-5-(3-dimethylaminopropylidene) - 5H - dibenzo[a,d]cycloheptene hydrogen oxalate, M.P. 192–200° C., dec., is 2.9 g. (90.5%). This materail, a mixture of geometric isomers, is triturated with 300 ml. of boiling isopropyl alcohol. The insoluble α-isomer (1.45 g.) is collected and recrystallized repeatedly from absolute methanol until a constant M.P. of 222–223° C., dec., is attained.

*Analysis.*—Calcd. for $C_{22}H_{26}O_2N_2S \cdot C_2H_2O_4$: C, 61.00; H, 5.97; N, 5.93. Found: C, 60.74; H, 5.91; N, 5.89.

The isopropyl alcohol filtrate obtained as described above is concentrated to ½ volume and chilled. The β-isomer crystallizes in a yield of 1.18 g., M.P. 194–196° C., dec. A constant M.P. of 198–199° C., dec., is attained after repeated recrystallizations from a mixture of absolute ethanol and absolute ether and from isopropyl alcohol.

*Analysis.*—Calcd. for $C_{22}H_{26}O_2N_2S \cdot C_2H_2O_4$: C, 61.00; H, 5.97; N, 5.93. Found: C, 60.92; H, 6.09; N, 5.87.

EXAMPLE 2

*7-chloro-5-(3-dimethylaminopropylidene) - 3 - dimethylsulfamoyl-5H-dibenzo[a,d]cycloheptene*

A. *Preparation of 7-chloro-3-fluorosulfonyl-10,11 - dihydro-5H-dibenzo[a,d]cyclohepten-5-one.*—By following the same procedure described in Example 1, Step A, and using 300 ml. fluorosulfonic acid and 50.00 g. (0.206 mole) of 3-chloro-10,11-dihydro-5H-dibenzo[a,d]cyclohepten-5-one, a gray solid is obtained when the reaction mixture is poured onto crushed ice. The solid is collected and extracted with five 250 ml. portions of boiling benzene. The combined extracts are evaporated under reduced pressure and the black solid residue is boiled with 450 ml. cyclohexane and the resulting mixture filtered. On cooling, the brown filtrate deposits 19.10 g. of product melting at 132.5–136.5° C. Recrystallization from cyclohexane gives 17.02 g. (25%) of product, M.P. 138.5–140° C.

*Analysis.*—Calcd. for $C_{15}H_{10}O_3ClFS$: C, 55.47; H, 3.10; S, 9.87. Found: C, 55.30; H, 3.23; S, 10.01.

B. *Preparation of 7-chloro-3-dimethylsulfamoyl-10,11-dihydro - 5H - dibenzo[a,d]cyclohepten-5-one.*—Starting with 7-chloro-3-fluorosulfonyl-10,11-dihydro-5H - dibenzo[a,d]cyclohepten-5-one (22.64 g., 0.070 mole), 120 ml. of p-dioxane, and 120 ml. of 25% aqueous dimethylamine and following essentially the same procedure described in Example 1, Step B, the product is obtained as a tan solid, M.P. 154.5–155.5° C., in a yield of 18.44 g. (75%). An analytical sample melts at 154.5–155° C. after recrystallization from benzene-hexane.

*Analysis.*—Calcd. for $C_{17}H_{16}ClNO_3S$: C, 58.36; H, 4.61; N, 4.00. Found: C, 58.37; H, 4.65; N, 3.91.

C. *Preparation of 7-chloro-3-dimethylsulfamoyl-5H-dibenzo[a,d]cyclohepten-5-one.*—A mixture of 7-chloro-3-dimethylsulfamoyl - 10,11 - dihydro - 5H - dibenzo[a,d]cyclohepten-5-one (2.74 g., 0.0078 mole), N-bromosuccinimide (2.12 g., 0.012 mole), benzoyl peroxide (30 mg.), and 20 ml. of benzene (previously dried over calcium hydride) is stirred and heated to refluxing for 3.5 hours. The succinimide is filtered and washed with warm benzene. The benzene filtrate is washed with 5% aqueous sodium hydroxide and then with water, and evaporated to dryness under reduced pressure. The residual oily solid is suspended in 60 ml. of triethylamine and stirred at reflux for 16 hours. The reaction mixture is partitioned between benzene and water, the benzene layer is separated, and evaporated under reduced pressure. The solid residue is dissolved in benzene and washed with 3 N hydrochloric acid and then with water, and evaporated to dryness under reduced pressure. The residual solid is dissolved in benzene and boiled with decolorizing carbon for 20 minutes. The filtrate is diluted with hexane to incipient cloudiness and 1.79 g. of tan solid, M.P. 165–168° C., is obtained on cooling to room temperature. Recrystallization from benzene - hexane gives 1.67 g. (62%) of product melting at 167.5–168.5° C. An analytical sample melts at 170–171° C. after recrystallization from benzene-hexane followed by recrystallization from ethanol-water.

*Analysis.*—Calcd. for $C_{17}H_{14}ClNO_3S$: C, 58.70; H, 4.06; N, 4.03. Found: C, 58.50; H, 4.02; N, 4.00.

D. *Preparation of 7-chloro-5-(3-dimethylaminopropyl)-3-dimethylsulfamoyl - 5 - hydroxy-5H-dibenzo[a,d]cycloheptene.*—A tetrahydrofuran solution of 3-dimethylaminopropyl magnesium chloride is prepared from 0.78 g. (0.032 g. atom) of magnesium and 3.87 g. (0.032 mole) of 3-dimethylaminopropyl chloride in 21 ml. of tetrahydrofuran as described in Step E of Example 1. The solution of the Grignard reagent is stirred and cooled in an ice-bath while 7-chloro-3-dimethylsulfamoyl-5H-dibenzo[a,d]cyclohepten-5-one (5.60 g., 0.016 mole) is added portionwise over a period of fifteen minutes. After stirring for another 30 minutes at ice-bath temperature and for 1.5 hours at room temperature, the bulk of the solvent is distilled below 45° C. under reduced pressure. The residue is dissolved in 50 ml. of benzene and the Grignard adduct is hydrolyzed by the dropwise addition of 14 ml. of water with cooling in an ice-bath. The benzene solution is decanted and the gelatinous precipitate is extracted three times with 80 ml. portions of boiling benzene. The combined benzene extracts are washed with water and then evaporated under reduced pressure. Crystallization of the residual solid from ethanol-water yields 5.19 g. (75%) of product, M.P. 173–174.5° C. An analytical sample melts at 175–176° C. on recrystallization from ethanol-water.

*Analysis.*—Calcd. for $C_{22}H_{27}ClN_2O_3S$: C, 60.74; H, 6.26; N, 6.44. Found: C, 60.42; H, 6.18; N, 6.40.

E. *Preparation of 7-chloro-5-(3-dimethylaminopropylidene) - 3 - dimethylsulfamoyl - 5H - dibenzo - [a,d] - cycloheptene (mixed geometric isomers).*—A solution of 7 - chloro - 5 - (3 - dimethylaminopropyl) - 3 - dimethylsulfamoyl - 5 - hydroxy - 5H - dibenzo[a,d]cycloheptene (1.72 g., 0.0040 mole) in 12 ml. of glacial acetic acid is cooled in an ice-bath and saturated with anhydrous hydrogen chloride for five minutes. Acetic anhydride (1.63 g., 0.016 mole) then is added and the soltuion heated on a steam-bath for 2.5 hours. After cooling to room temperature, the solution is diluted with 17 ml. of water, covered with 50 ml. of benzene, cooled in an ice-bath, and made basic with 10 N sodium hydroxide. The benzene layer is separated and the aqueous layer is extracted with two 35 ml. portions of benzene. The combined extracts are boiled with decolorizing carbon and filtered. The filtrate is washed with water and dried over sodium sulfate. The benzene then is evaporated under reduced pressure. The mixed geometric isomers of 7-chloro-5-(3-dimethylaminopropyl) - 3 - dimethylsulfamoyl - 5H - dibenzo[a,d]cycloheptene are obtained as a yellow oil in quantitative yield (1.67 g.).

F. *α-Isomer of 7-chloro-5-(3-dimethylaminopropylidene) - 3 - dimethylsulfamoyl - 5H - dibenzo[a,d]cycloheptene.*—The mixture of geometric isomers from Step E is dissolved in absolute ethanol, 3 ml., and treated with a solution of 0.49 g. (0.0042 mole) of maleic acid in 1 ml. of absolute ethanol. Anhydrous ether, 16 ml., is added to incipient cloudiness and a tan precipitate of the mixed geometric isomers, M.P. 147–156° C., is obtained in 91.5% yield (1.95 g.). One crystallization of this material yields 1.21 g. of the hydrogen maleate of the α-isomer, M.P. 166–170° C. The mother liquor from this yellow solid is used to prepare the β-isomer below. The hydrogen maleate is recrystallized from absolute ethanol until a constant M.P. of 174–175.5° C. is attained.

*Analysis.*—Calcd. for $C_{22}H_{25}ClN_2O_2S \cdot C_4H_4O_4$: C, 58.58; H, 5.48; N, 5.26. Found: C, 58.82; H, 5.73; N, 5.13.

G. *Preparation of the β-isomer of 7-chloro-5-(3-dimethylaminopropylidene) - 3 - dimethylsulfamoyl - 5H-dibenzo[a,d]cycloheptene.*—The mother liquor from the first crystallization of the maleate salt of the mixed geometric isomers from Step F is evaporated to dryness under reduced pressure. The brown, oily residue is dissolved in 10 ml. of water, the solution is made alkaline, and extracted with three 20 ml. portions of benzene. The combined extracts are washed and then evaporated to dryness under reduced pressure. The base of the β-isomer is obtained as a yellow oil, wt. 0.56 g. The base is converted to the oxalate salt by using a five-percent molar excess of the acid in absolute ethanol. The oxalate, which melts at 184.5° C. with decomposition, is dissolved in water and treated with a five-percent molar excess of picric acid in an equal volume of ethanol. The resulting yellow picrate salt melts at 238.5–239° C. with decomposition. Recrystallization from n-propyl alcohol-water yields material melting at 240–240.5° C., with decomposition.

*Analysis.*—Calcd. for $C_{22}H_{25}ClN_2O_2S \cdot C_6H_3N_3O_7$: C, 52.05; H, 4.37; N, 10.84. Found: C, 52.13; H, 4.61; N, 10.59.

H. *Preparation of the base of the β-isomer of 7-chloro-5 - (3 - dimethylaminopropylidene) - 3 - dimethylsulfamoyl-5H-dibenzo[a,d]cycloheptene.*—250 mg. of the picrate salt of the β-isomer is suspended in 5 N lithium hydroxide solution, 20 ml., and benzene, 150 ml., and shaken mechanically for 6 hours. The benzene layer is separated and washed with 5 N lithium hydroxide, followed by washing with water. After evaporation of the benzene under reduced pressure, the brown oily residue weighs 330 mg. The oil is partitioned between 0.1 N hydrochloric acid, 5 ml., and benzene, 8 ml. The aqueous layer is separated, rendered alkaline with 5% sodium hydroxide solution, and extracted with two 10 ml. portions of benzene. The combined extracts are washed with water, dried over anhydrous sodium sulfate, and evaporated under reduced pressure. The yellow oily residue of the base of the β-isomer weighs 140 mg. (88%).

We claim:
1. A compound selected from the group consisting of compounds having the structural formulae:

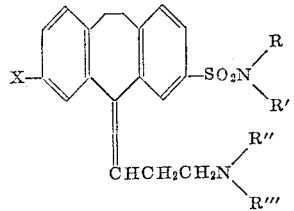

and

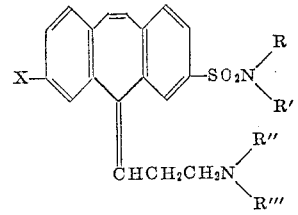

and non-toxic salts thereof; wherein R and R' are lower alkyl radicals, X is selected from the group consisting of hydrogen and halogen and R" and R'" are selected from the group consisting of lower alkyl radicals and lower alkyl radicals linked together through an atom selected from the group consisting of carbon, nitrogen and oxygen to form a heterocyclic ring selected from the group consisting of 1-piperidyl, 1-pyrrolidyl, 4-morpholinyl and 1-lower alkyl-4-piperazinyl.

2. 3-dimethylsulfamoyl - 5 - (3-dimethylaminopropylidene)-5H-dibenzo[a,d]cycloheptene.

3. The β-isomer of 3-dimethylsulfamoyl-5-(3-dimethylaminopropylidene)-5H-dibenzo[a,d]cycloheptene.

4. A compound selected from the group consisting of compounds having the structural formulae:

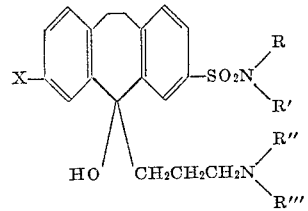

and

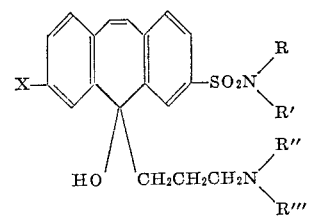

and salts thereof; wherein X is selected from the group consisting of hydrogen and halogen, R and R' are lower alkyl radicals and R" and R'" are selected from the group consisting of lower alkyl radicals and lower alkyl radicals linked together through an atom selected from the group consisting of carbon, nitrogen and oxygen to form a heterocyclic ring selected from the group consisting of 1-piperidyl, 1-pyrrolidyl, 4-morpholinyl and 1-lower alkyl-4-piperazinyl.

5. 5-(3-dimethylaminopropyl) - 3 - dimethylsulfamoyl-5-hydroxy-5H-dibenzo[a,d]cycloheptene.

(References on following page)

References Cited by the Examiner

UNITED STATES PATENTS

| | | | |
|---|---|---|---|
| 2,686,202 | 8/1954 | McCoy et al. | 260—543 |
| 2,726,265 | 12/1955 | Gregory et al. | 260—556 |
| 2,985,653 | 5/1961 | Jacob et al. | 260—243 |
| 3,047,571 | 7/1962 | Jacob et al. | 260—243 |
| 3,055,890 | 9/1962 | Jacob et al. | 260—243 |
| 3,073,847 | 1/1963 | Doebel et al. | |
| 3,082,210 | 3/1963 | Jacob et al. | 260—243 |
| 3,084,160 | 4/1963 | Jacob et al. | 260—243 |

OTHER REFERENCES

Villani et al.: "Jour. of Medicinal and Pharm. Chem.," vol. 5, No. 2, pp. 373–83 (1962).

Winthrop et al.: "Jour. Org. Chem.," vol. 27, pp. 230–40 (1962).

CHARLES B. PARKER, *Primary Examiner.*

IRVING MARCUS, *Examiner.*

R. V. HINES, *Assistant Examiner.*